United States Patent [19]
Senyek et al.

[11] Patent Number: 4,559,374
[45] Date of Patent: Dec. 17, 1985

[54] CONTINUOUS EMULSION POLYMERIZATION PROCESS FOR PREPARATION OF FLAME-RETARDANT LATEX

[75] Inventors: Michael L. Senyek, Tallmadge; Mitchell S. Kolaczewski, Akron, both of Ohio

[73] Assignee: The Goodyear Tire & Rubber Company, Akron, Ohio

[21] Appl. No.: 652,042

[22] Filed: Sep. 19, 1984

[51] Int. Cl.$^4$ .......................... C08F 2/22; C08F 2/24
[52] U.S. Cl. ................................. 523/348; 524/460; 524/822; 524/458
[58] Field of Search .................. 524/822, 460, 458; 523/348, 353

[56] References Cited

U.S. PATENT DOCUMENTS

| | | | |
|---|---|---|---|
| 3,324,066 | 6/1967 | Archangeli | 524/822 |
| 3,547,857 | 12/1970 | Murray | 526/909 |
| 4,022,744 | 5/1977 | D'Achille | 523/348 |
| 4,156,669 | 5/1979 | Lee | 524/822 |
| 4,177,181 | 12/1979 | Tsurumi | 524/822 |
| 4,325,856 | 4/1982 | Ishikawa | 525/301 |
| 4,480,078 | 10/1984 | Gujarathi | 524/460 |

FOREIGN PATENT DOCUMENTS 2451627  5/1975  Fed. Rep. of Germany ...... 524/822

Primary Examiner—C. Warren Ivy
Attorney, Agent, or Firm—Alvin T. Rockhill

[57] ABSTRACT

This invention relates to an improved continuous emulsion polymerization process for preparation of flame-retardant latex. Specifically, this invention relates to a novel method for the preparation of high solids, flame-retardant latex with high chlorine content in high conversion containing polymerized vinylidene chloride and at least one monoethylenically unsaturated carboxylic acid. The improved continuous polymerization process is characterized by continuous addition of all of the vinylidene chloride and all of the monoethylenically unsaturated carboxylic acid monomers along with a portion of the remaining monomers to a first reaction vessel followed by the subsequent continuous addition of the rest of the remaining monomers and additional surfactant solution to a second reaction vessel in a chain consisting of three or more reaction vessels. The flame-retardant latices produced by the process of the invention have improved physical and application properties.

13 Claims, No Drawings

CONTINUOUS EMULSION POLYMERIZATION PROCESS FOR PREPARATION OF FLAME-RETARDANT LATEX

BACKGROUND OF THE INVENTION

There are three different types of polymerization processes which may be used to prepare aqueous latices. These processes are batch, semi-continuous or semi-batch, and continuous. Each type of process has its unique characteristics and limitations. Although the basic chemistry of free radical emulsion polymerization is common, each process differs substantially, in that different reaction components and conditions are found in each. Different materials, variations in process conditions, and the method and logistics of material addition all play a major role in determining final product properties and these factors vary from process to process.

SUMMARY OF THE INVENTION

This invention relates to a novel continuous emulsion polymerization process for the preparation of high solids, flame-retardant latex with high chlorine content in high conversion containing polymerized vinylidene chloride units. The process may be described as involving feeding continuously at a definite rate, emulsion polymerization ingredients comprising monomers, water, emulsifying agents, initiators or catalysts, electrolytes, molecular weight regulators, and any other desired polymerization ingredients to a first reaction vessel wherein the material is retained for a definite time of dwell while partial polymerization takes place. The mixture is continuously withdrawn from the first reaction vessel, at a rate equal to the rate at which material is fed to the first reaction vessel, and introduced to a second reaction vessel where additional monomers, emulsifying agents, and if desired additional initiators or catalysts are continuously fed into the second reaction vessel where the polymerization is further continued to a desired degree of completion for a definite time of dwell. A stream of the resulting polymer latex is withdrawn continuously from the second reaction vessel at a rate equal to the rate of introduction of materials to the second reaction vessel. The stream of resulting polymer latex is then fed continuously into a third reaction vessel and if desired a stream of additional initiators or catalysts are continuously fed into the third reaction vessel where the polymerization is further continued to the desired degree of completion. A stream of the resulting polymer latex is withdrawn from the third reaction vessel at a rate equal to the rate of introduction of material to the third reactor. In this way a constant volume of material is maintained in each reaction vessel. The mixture in each reaction vessel is continuously agitated and maintained at a substantially constant desired polymerization temperature.

More specifically, to the first of several reaction vessels connected in series, initiators or catalysts, surfactants or emulsifying agents, water, electrolytes, molecular weight regulators, and any other desired polymerization ingredients and monomers consisting of all of the vinylidene chloride, all of the monethylenically unsaturated carboxylic acid, ester or amide, a portion of the aliphatic conjugated diolefins, and a portion of the monovinylidene aromatic monomers are added continuously. To the second reaction vessel containing the continuously fed stream of partially polymerized latex from the first reaction vessel, are added continuously the remaining portion of monomers consisting of the remaining aliphatic conjugated diolefins and monovinylidene aromatic monomers along with an aqueous stream of emulsifying agents and if desired additional catalysts or initiators. The stream of resulting polymer latex is withdrawn continuously from the second reaction vessel and fed into a third vessel where additional catalysts or initiators can be added if desired and the polymerization is completed with essentially complete conversion taking place. In this way a high conversion latex can be obtained having a low concentration of residual monomers, with a particularly low residual vinylidene chloride monomer level. This is advantageous in that the recycle monomer stream is kept to a minimum. It was surprisingly found that the latex polymer conversion is extremely high compared to operating the continuous polymerization process with all of the monomers added only in the first reaction vessel. Also, it was unexpectedly found that lower residual vinylidene chloride monomer levels are obtainable by adding all of the vinylidene chloride monomer in the first reaction vessel rather than splitting the vinylidene chloride between the first and second reaction vessels. In addition, the properties of the resulting latex obtained from addition of all of the vinylidene chloride in the first reaction vessel are superior to the corresponding properties of the latex obtained by splitting the vinylidene chloride between the first and second reaction vessels.

This invention more specifically discloses an improved continuous emulsion polymerization process for the preparation of flame retardant latex comprising the steps of:

(a) continuously adding to a first reaction vessel a mixture of reagents including: at least one emulsifying agent, at least one monoethylenically unsaturated carboxylic acid, ester or amide, at least one aliphatic conjugated diolefin, at least one monovinylidene aromatic monomer, vinylidene chloride and at least one polymerization initiator;

(b) allowing said mixture of reagents to remain in said first reaction vessel for partial polymerization to take place to form a partially polymerized latex, wherein the partially polymerized latex is withdrawn from the first reaction vessel continuously at a rate equal to the total rate of addition of the mixture of reagents to the first reaction vessel;

(c) continuously adding to the second reaction vessel additional reagents consisting essentially of additional conjugated diolefins, additional monovinylidene aromatic monomers, and additional emulsifying agents to form a partially polymerized latex/monomer mixture wherein said partially polymerized latex/monomer mixture is allowed to remain in the second reactor for a substantial degree of polymerization to take place to form a substantially polymerized latex wherein the substantially polymerized latex made in the second reactor is withdrawn continuously at a rate equal to the total rate of addition of the partially polymerized latex and additional reagents to the second reaction vessel and fed into a third reaction vessel; and (d) allowing the substantially polymerized latex to remain in the third reaction vessel until essentially complete conversion takes place.

PREFERRED METHOD FOR CARRYING OUT THE INVENTION

The novel continuous process of this invention is particularly suitable for the emulsion polymerization of vinylidene chloride with styrene and butadiene and one or more unsaturated carboxylic acids, esters, or amides.

The continuous process is best carried out in a series of continuous stirred tank reactors (CSTR). Preferably the process is carried out in a group of three reaction vessels connected in series. Preferably the polymerization is conducted at a pH of 1.5 to 3.5 and under constant pressure of 50–170 psig, which can be controlled by a back pressure regulator provided in the system. A constant temperature can be maintained in each reactor throughout the polymerization. In some cases it may be desirable to raise the temperature in the second and/or third reactors. The various feed streams are continuously supplied at the appropriate charge rate so as to maintain the total residence time which corresponds to the reaction time at 9 to 18 hours (3 to 6 hours per reactor).

The preferred temperature ranges when using a persulfate initiator is from about 60° C. to about 100° C. A more preferred temperature range for persulfate initiators is from 70° C. to 95° C. In cases where redox type catalysts are used lower polymerization temperatures are generally desirable.

The improved continuous emulsion polymerization process of this invention is best carried out by continuously adding to a first reaction vessel the polymerization ingredients including emulsifying agents and monomers consisting of all of the vinylidene chloride, all of the monoethylenically unsaturated carboxylic acid, ester, or amide, a portion of the aliphatic conjugated diolefins, and a portion of the monovinylidene aromatic monomers where partial polymerization takes place. The partially polymerized latex having a conversion of 70% to 85% from the first reaction vessel is then continuously withdrawn at a rate equal to the total rate that the various streams of ingredients are feed into the first reaction vessel and fed into a second reaction vessel. The remaining portion of monomers which consist of the remaining aliphatic conjugated diolefins and monovinylidene aromatic monomers, along with an aqueous stream of emulsifying agents and if desired additional catalysts or initiators are also continuously added to the second reaction vessel. The substantially polymerized latex made in the second reaction vessel is continuously withdrawn at a rate equal to the total rate of feed of the various streams into the second reaction vessel. This stream of substantially polymerized latex which has a conversion in the range of 85% to 95% is fed continuously into a third reaction vessel where additional catalysts or initiators may be added if desired and the polymerization is completed to the desired degree with essentially complete conversion taking place. The final resulting polymeric latex which has a conversion of at least 90% is withdrawn continuously from the third reaction vessel at a rate equal to the total rate of feed streams into the third reaction vessel.

The preferred weight percent of total monomers charged to the reaction system added in the first reaction vessel is 50 to 95%, while the preferred weight percent to the second reaction vessel is 50 to 5%. Thusly, the split ratio of total monomers between the first and second reaction vessels ranges from 50/50 to 90/10. The most preferred range for vinylidene chloride latices is 65/35 to 90/10. In most cases it is preferred to charge from 60 to 90 weight percent of the total monomers being charged into the first reactor. Generally it will be preferred for from 10% to 80% of the total conjugated diolefin monomers being charged to be added to the second reactor with 5% to 80% of the monovinylidene aromatic monomers being added to the second reactor. It is normally more preferred for from 30% to 60% of the total conjugated diolefin monomers being charged and from 25% to 55% of the monovinylidene aromatic monomers being charged to be added to the second reactor. The preferred amounts of monomers are: vinylidene chloride 15 to 45 weight percent of the total monomers charged to the reaction system, monoethylenically unsaturated carboxylic acids, esters or amides 0.2 to 5 weight percent, aliphatic conjugated diolefins 20 to 75 weight percent, and the monovinylidene aromatic monomer 55 to 5 weight percent. Generally it will be more preferred for the monomer charge ratio to be comprised of from 25 to 40 weight percent vinylidene chloride, from 1 to 3 weight percent monoethylenically unsaturated carboxylic acids, esters or amides, from 25 to 50 weight percent conjugated diolefins, and from 15 to 35 weight percent monovinylidene aromatic monomers. For the aliphatic conjugated diolefins and monovinylidene aromatic monomers any ratio of these monomers between the first and second reaction vessels may be utilized within the preferred ranges specified.

The aliphatic conjugated diolefins useful in this invention are comprised of conjugated dienes preferably having 4 to 12 carbon atoms. Examples of suitable conjugated diolefins are 1,3-butadiene, isoprene, 2,3-dimethyl-1,3-butadiene, 2-methyl-1,3-butadiene, 2-ethyl-1,3-butadiene, 1,3-pentadiene, 2-methyl-1,3-pentadiene, 1,3-hexadiene, 2-phenyl-1,3-butadiene, 1,3-heptadiene, 1,3-octadiene, 3-methyl-1,3-pentadiene, 4-methyl-1,3-pentadiene, and the like. Mixtures of diolefins may also be used. In most cases butadiene will be used as the conjugated diolefin monomer.

The vinyl-substituted aromatic compounds (monovinylidene aromatic monomers) useful in this invention are comprised of compounds containing 8 to 16 carbon atoms. Examples of vinyl-substituted aromatic compounds are styrene, α-methylstyrene, vinyl toluene, 3-methylstyrene, 4-methylstyrene, 4-cyclohexylstyrene, 4-para-tolylstyrene, para-chlorostyrene, 3-vinyl-α-methylstyrene, 4-vinyl-α-methylstyrene, 1-vinylnaphthalene, 2-vinylnaphthalene, and the like. In most cases styrene will be used as the vinyl-substituted aromatic monomer.

The monoethylenically unsaturated carboxylic acids, esters, or amides useful in this invention are comprised of α, β-olefinically unsaturated carboxylic acids containing from 3 to 12 carbon atoms such as methacrylic acid, acrylic acid, crotonic acid, sorbic acid, itaconic acid, α-chlorosorbic acid, cinnamic acid, citraconic acid, maleic acid, fumaric acid, mesaconic acid, aconitic acid, and glutaconic acid and α,β-olefinically unsaturated amides such as acrylamide, N-methylacrylamide, N,N-dimethylacrylamide, N-tert-butylacrylamide, N-cyclohexylacrylamide, methacrylamide, N-methylolacrylamide, and N-methylolmethacrylamide. Mixtures of α,β-olefinically unsaturated carboxylic acids or amides may also be used. Typical esters include hydroxyethylacrylate, methyl acrylate, ethyl acrylate, methyl methacrylate, methylitaconate, n-butylitaconate, di-n-butylitaconate, dimethylitaconate, dibutyl maleate, dibutyl fumarate, and dimethylamino ethyl methacrylate. In most cases itaconic acid will be used as the monoethylenically unsaturated carboxylic acid, ester or amide.

The process of the present invention contemplates the incorporation of polymerizable antioxidants into latices made thereby. These antioxidants have shown great potential in the stabilization of oxidizable organic materials due to their nonextractability and nonvolatility. These antioxidants as monomers are polymerized with one or more comonomers so as to have the antioxidant moiety chemically attached to the polymer structure. The following list is representative of polymerizable antioxidants that can be used in the process of this invention:

N-(4-anilinophenyl)acrylamide
N-(4-anilinophenyl)methacrylamide
N-(4-anilinophenyl)maleimide
N-(4-anilinophenyl)itaconimide
4-anilinophenyl acrylate
4-anilinophenyl methacrylate
3-N-(4'-anilinophenyl)amino-2-hydroxy-propyl methacrylate Such polymerizable antioxidants are incorporated into latices in useful amounts and may be added to the first, second or third reactors. These polymerizable antioxidants can be considered functional or specialty monomers and may be used accordingly.

Other ingredients such as acids, electrolytes, chain transfer agents, chelating agents, and similar ingredients known in the art to be useful in emulsion polymerization may be employed in any of the feed streams or series of reactors during polymerization. A representative chelating agent useful in the practice of the present invention is the sodium salt of ethylenediaminetetracetic acid.

The electrolytes suitable for use in this invention are those customarily used in emulsion polymerization. Typical electrolytes include trisodium phosphate, tetrasodium pyrophosphate, tripotassium phosphate, tetrapotassium pyrophosphate, sodium, potassium, and ammonium carbonates, bicarbonates, and sulfates. Tetrasodium pryophosphate is preferred. The concentrations of chelating agents and electrolytes useful in the invention are those minimum amounts necessary for achieving the desired effect.

Conventional chain transfer agents may be employed in the practice of this invention. Examples of these chain transfer agents include mercaptans, bromoform, carbon tetrabromide, and carbon tetrachloride. The most preferred are mercaptans. Examples of suitable mercaptans are n-octyl mercaptan, n-nonylmercaptan, tert-nonyl mercaptan, n-decyl mercaptan, n-dodecyl mercaptan, sec-dodecyl mercaptan, tert-dodecyl mercaptan, tert-tetradecyl mercaptan, tert-hexadecyl mercaptan, sec-hexadecyl mercaptan, n-hexadecyl mercaptan, or mixtures of mercaptans.

Suitable free radical polymerization initiators or catalysts employed in the process of this invention are those which are traditionally utilized in emulsion polymerization. Typical initiators or catalysts are persulfates, water soluble peroxides, and hydroperoxides. Typical examples of these initiators are ammonium, potassium, and sodium persulfate, hydrogen peroxide, t-butylhydroperoxide, cumene hydroperoxide, para-menthane hydroperoxide, and peroxy carbonates.

Other catalysts such as redox catalysts may be employed. One such redox system consists of ferrous sulfate heptahydrate, sodium formaldehyde sulfoxylate, and potassium or ammonium persulfate. The advantages of the redox catalysts are well known in the art and usually allow lower polymerization temperatures. The most preferred initiators or catalysts are ammonium persulfate, potassium persulfate, and sodium persulfate. The initiators or catalysts are used in an amount sufficient to cause polymerization.

A listing of various emulsifiers and detergents which may be useful in this invention is given in the book "McCutcheon's Emulsifiers and Detergents 1981 Annuals," which is incorporated herein by reference in its entirety. The emulsifiers useful in this invention may be a combination of one or more emulsifiers of the anionic, cationic, non-ionic, or amphoteric class of surfactants. Suitable anionic emulsifying agents are alkyl sulfonate, alkyl aryl sulfonates, condensed naphthalene sulfonate, alkyl sulfates, ethoxylated sulfates, phosphate esters, and esters of sulfosuccinic acid. Representative of these emulsifiers are sodium alpha-olefin ($C_{14}$–$C_{16}$) sulfonates, alkali metal or ammonium dodecylbenzene sulfonates, disodium dodecyl diphenyloxide disulfonate, disodium palmityl diphenyloxide disulfonate, sodium, potassium, or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutylsulfosuccinate, disodium ethoxylated nonyl phenol half ester of sulfosuccinic acid, tetrasodium N-(1,2-dicarboxyethyl)-N-octadecyl sulfosuccinamate, disodium isodecyl sulfosuccinate, sodium bistridecyl sulfosuccinate, sodium salt of alkyl aryl polyether sulfate, lauryl alcohol ether sulfate, sodium salt of condensed napthalene sulfonic acid, complex phosphate ester of ethylene oxide adduct.

Suitable and representative nonionic emulsifying agents are alkyl phenol ethoxylate, octylphenoxy poly(ethyleneoxy)ethanol, nonyl phenoxypoly(ethyleneoxy)ethanol.

The amount of emulsifying agents (surfactants) used is normally in the range from about 0.3 to 8.0 phm (parts of emulsifying agent per one hundred parts of monomers) in the polymerization system consisting of a series of CSTR (continuous stirred tank reactors) reactors. Generally it is preferred for from 0.3 phm to 2 phm of the surfactants to be present in the first reactor. It is generally more preferred for from 0.4 phm to 1 phm of surfactants to be added to the first reactor. In most cases from 0.15 phm to 1.5 phm of surfactants will be added to the second reactor with the addition of 0.2 phm to 1 phm of surfactants to the second reactor being preferred.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLE 1

In a three-reactor chain of continuous stirred-tank reactors (CSTR) connected in series, a carboxylated styrene butadiene latex of about 40% solids was added to the first reactor to fill its volume about half full. The reactor system was purged with nitrogen. This latex was heated to 85° C. Continuous polymerization was commenced by adding a buffer solution stream at the rate of 4.75 lbs./hr. and a monomer stream at a rate of 3.62 lbs./hr. continuously to the first reactor. The buffer solution stream consisted of 91.9 phm of water, 0.64 phm of surfactant system, 0.037 phm of the sodium salt of ethylenediamine tetraacetate, 0.06 phm of tetrasodium pyrophosphate, 0.85 phm of ammonium persulfate, and 2.65 phm of itaconic acid. The monomer stream consisted of 21.2 phm of 1,3-butadiene, 16.2 phm of styrene, 35 phm of vinylidene chloride, and 0.13 phm tert-dodecyl mercaptan. After the first reactor was filled the latex stream was directed into the second reactor maintained at about 93° C. Then, a second buffer solution stream at a rate of 0.36 lbs./hr. and a second monomer stream at a rate of 1.25 lbs./hr. were continuously fed into the second reactor. The buffer solution stream consisted of 5.67 phm of water, 1.0 phm of the surfactant system, 0.0076 phm of the sodium salt of ethylenediamine tetracetate, 0.012 phm of tetrasodium pyrophosphate, and 0.5 phm of ammonium persulfate. The monomer stream consisted of 9.5 phm of styrene, 15.5 phm of 1,3-butadiene, and 0.094 phm of tert-dodecyl mercaptan. The monomer split ratio by weight between Reactors 1 and 2 was 75 to 25. After the second reactor was filled, the latex stream from the second reactor was directed into a third reactor maintained at about 93° C. To the third reactor, a buffer stream at a rate of 0.12 lbs./hr. consisting of 2.20 phm of water, 0.016 phm of tetrasodium pyrophosphate, and 0.15 phm of ammonium persulfate was added. The total residence time in the three reactors was maintained at approximately 13 hours by making the appropriate adjustment in pumping rates of the various streams. A pressure of 125 psig was maintained on the system by means of a back-pressure valve. After 28 hours, the resulting latex out of the third reactor had the following residual monomers analysis (based on 100 grams of latex): residual styrene 0.7% and residual vinylidene chloride 0.8%.

The final latex was neutralized to a pH of 9–10 with ammonium hydroxide during stripping. Polymerization data and latex properties were as follows:

|  | Reactor #1 | Reactor #2 | Reactor #3 |
| --- | --- | --- | --- |
| % conversion | 79 | 94 | 95.5 |
| Latex Properties After Stripping | | | |
| Solids, % |  |  | 55 |
| Brookfield viscosity, mPa · s |  |  | 118 |
| Turbidity |  |  | 2.12 |
| Surface tension, mN/m |  |  | 39.2 | mPa · s = milliPascal-second
mN/m = meganewtons per meter

A sample of the latex was allowed to dry at ambient temperature as a film. After vacuum drying the film analyzed 22.6% chlorine content and had a glass transition temperature of 4° C.

To a sample of the latex, 324 phr (parts per hundred parts of dry rubber) of Whiting D70 filler (a calcium carbonate type filler) and 76 phr of aluminum trihydrate were added. A Limiting Oxygen Index Test (LOI) was run on a specimen prepared using this compounded latex according to ASTM D-2863. This test measures the amount (percentage) of oxygen in an oxygen-nitrogen atmosphere required to just sustain burning of a specimen burning in a candle-like fashion. The test specimen gave an LOI of 32.2%, indicating flame retardancy since the percentage of oxygen in normal air is considerably less than this amount.

To obtain gum film stress-strain properties on a film approximately 25 mils thick, a sample of the latex was cast and dried overnight at ambient conditions, 3 hours at 70° C., and 10 minutes at 280° F. This film had a tensile strength of 1840 psi at 130% elongation with a 100% modulus of 1670 psi.

EXAMPLE 2 (COMPARATIVE)

This example demonstrates the necessity of splitting the monomer charge between the first and second reactors with all of the vinylidene chloride added in the first reactor.

The general procedure of Example 1 was followed except that all of the monomers were added to the first reactor. To the first reactor containing a carboxylated styrene-butadiene latex of about 40% solids, a monomer stream consisting of 24.5 phm of styrene, 37.9 phm of butadiene, 35 phm of vinylidene chloride and 0.25 phm of tert-dodecyl mercaptan was added continuously along with a buffer stream consisting of 90.3 phm of water, 1.20 phm of the surfactant system, 0.10 phm of the sodium salt of ethylenediamine tetraacetate, 0.06 phm of tetrasodium pyrophosphate, 0.85 phm of ammonium persulfate, and 2.65 phm of itaconic acid. To the second reactor, only 0.5 phm ammonium persulfate was added continuously along with the latex from the first reactor. After 28 hours of running time, the latex conversion in the second reactor was 82% and the conversion of the latex exiting from the third reactor was also 82%. A dried film of this latex, prepared similarly to Example 1, had a chlorine content of 20.7%. Residual monomers analysis (based on 100 grams latex) gave 1.7% sytrene and 2.4% vinylidene chloride. Thusly, this latex was produced in lower conversion and with lower chlorine content than the latex prepared according to the present invention in Example 1.

EXAMPLE 3 (COMPARATIVE)

This example illustrates the unpredictable nature of the continuous polymerization of vinylidene chloride with other monomers. To the first reactor containing a latex of styrene, butadiene, vinylidene chloride, and itaconic acid having a solids content of about 40% prepared according to the process specified in Example 1, a monomer feed stream containing 34.6 phm of vinylidene chloride, 4.93 phm of methyl acrylate, and 0.094 phm of tert-dodecyl mercaptan was added along with a buffer solution of the same composition as described in Example 1 without itaconic acid. To the second reactor was added a monomer stream of 26.6 phm of styrene, 32.5 phm of butadiene, and 0.20 phm of tert-dodecyl mercaptan and a buffer stream consisting of 16.7 phm of water, 0.02 phm of the sodium salt of ethylenediamine tetraacetate, 1.0 phm of a surfactant system, 0.012 phm of tetrasodium pyrophosphate, 1.3 phm of itaconic acid, and 0.5 phm of ammonium persulfate. The monomer split ratio by weight between the first and second reactors was 39.5 to 60.5.

After 15 hours of continuous operation the conversion in the first reactor was 95% and the latex was free of coagulum. However, the percent conversion in the second reactor dropped from 91 to 62% between 13 and 15 hours of continuous operation and very heavy coagulum was noted throughout the second reactor. The coagulum plugged the outflow transfer line connecting the second and third reactors, preventing further continuous operation.

Thusly, this example demonstrates that splitting of the monomers between the first and second reactors will not by itself yield the desired latex and results. A judicious choice of monomers and polymerization conditions must be made when utilizing vinylidene chloride.

EXAMPLE 4

The general procedure specified in Example 1 was followed in this experiment. The first reactor in this experiment was filled about half-full a solids latex of styrene, butadiene, vinylidene chloride, and itaconic acid having a solids content of about 40% prepared according to the process specified in Example 1. The monomer stream was added to the first reactor at a rate of 3.62 lbs./hr. and consisted of 26.2 phm of butadiene, 11.2 phm of styrene, 35 phm of vinylidene chloride, and 0.36 phm of tert-dodecyl mercaptan. The first reactor was maintained at 85° C. After the first reactor was filled the latex stream was directed into the second reactor maintained at about 93° C. Then a second buffer solution stream at a rate of 0.36 lbs./hr. and a second monomer stream at a rate of 1.25 lbs./hr. were continuously fed into the latex in the second reactor. The buffer solution stream consisted of 6.10 phm of water, 0.5 phm of a surfactant system, 0.0076 phm of the sodium salt of ethylenediamine tetraacetate, 0.012 tetrasodium pyrophosphate, and 0.5 phm of ammonium persulfate. The monomer stream consisted of 9.5 phm of styrene, 15.5 phm of butadiene, and 0.125 phm of tert-dodecyl mercaptan. The monomer split ratio by weight between Reactors 1 and 2 was 75 to 25. After the second reactor was filled, the latex stream was directed to a third reactor maintained at about 93° C. To the third reactor, a buffer stream at a rate of 0.12 lbs./hr. consisting of 2.20 phm of water, 0.008 phm of tetrasodium pyrophosphate, and 0.15 phm of ammonium persulfate was added. The total residence time in the three reactors was maintained at approximately 13 hours by making the appropriate adjustment in pumping rates of the various streams. A pressure of 125 psig was maintained on the system by means of a back pressure regulator. After 28 hours, the resulting latex out of the third reactor had the following residual monomers analysis (based upon 100 grams latex): residual styrene 0.6% and residual vinylidene chloride 0.6%. The final latex, after 28 hours of continuous operation, was neutralized to a pH of 9-10 with ammonium hydroxide during stripping. Polymerization data and latex properties were as follows:

|  | Reactor #1 | Reactor #2 | Reactor #3 |
| --- | --- | --- | --- |
| % conversion | 83 | 94 | 97 |
| Latex Properties After Stripping | | | |
| Solids, % | | | 53.7 |
| Brookfield viscosity, LVT #2-60 rpm, mPa · s | | | 100 |
| Turbidity | | | 2.02 |
| Surface tension, mN/m | | | 47.5 |

A sample of the latex was allowed to dry at ambient temperature as a film. After vacuum oven drying, the film was determined to contain 23.4 weight percent chlorine and had a glass transition temperature of −9° C. The stress-strain properties of a gum film sample prepared and dried as given in Example 1 had a tensile strength of 1860 psi at 200% elongation with a 100% modulus of 721 psi.

EXAMPLE 5

The same procedure as described in Example 1 was used in this experiment. The buffer solution stream was fed at a rate of 4.75 lbs./hr. into the first reactor and was the same composition as specified in Example 1. The monomer stream fed into the first reactor at a rate of 3.62 lbs./hr. and consisted of 28.5 phm of butadiene, 8.85 phm of styrene, 35 phm of vinylidene chloride, and 0.38 phm of tert-dodecyl mercaptan. The first reactor was maintained at 85° C. After filling the first reactor, the latex stream was directed into the second reactor maintained at about 93° C. In the second reactor, a second buffer solution stream at a rate of 0.36 lbs./hr. and a second monomer stream at a rate of 1.25 lbs./hr. were continuously added to the latex in the second reactor. The buffer solution stream consisted of 5.30 phm of water, 1.0 phm of a surfactant system, 0.0076 phm of the sodium salt of ethylenediamine tetraacetate, 0.012 phm of tetrasodium pyrophosphate, and 0.5 phm of ammonium persulfate. The monomer stream consisted of 9.5 phm of styrene, 15.5 phm of butadiene, and 0.13 phm of tert-dodecyl mercaptan. The monomer split ratio by weight between Reactors 1 and 2 was 75 to 25. After filling the second reactor, the latex stream was directed to a third reactor maintained at 93° C. To the third reactor, a buffer stream at the rate of 0.12 lbs./hr. consisting of 2.2 phm of water, 0.016 phm of tetrasodium pyrophosphate, and 0.15 phm of ammonium persulfate was added. The total residence time in the three reactors was maintained at about 13 hours. After running continuously for 24 hours, a sample of the final latex from the third reactor was neutralized to a pH of 9-10 with ammonium hydroxide during stripping. Polymerization and latex properties were as follows:

|  | Reactor #1 | Reactor #2 | Reactor #3 |
| --- | --- | --- | --- |
| % conversion | 78 | 92 | 94.5 |
| Latex Properties After Stripping | | | |
| Solids, % | | | 53.7 |
| Brookfield viscosity, LVT #2, at 60 rpm mPa · s | | | 135 |
| Turbidity | | | 2.01 |
| Surface tension, mN/m | | | 39.7 |

A sample of the latex was allowed to dry at ambient temperature as a film. After vacuum drying, the film was determined to have a chlorine content of 24.1% and had a glass transition temperature of −23° C. The stress-strain properties of a gum film sample prepared and dried as given in Example 1 had a tensile strength of 1040 psi at 280% elongation with a 100% modulus of 270 psi. To a sample of the latex, 335 phr (weight parts per hundred weight parts of dry rubber) of Whiting D70 filler (calcium carbonate type filler) and 65 phr of aluminum trihydrate were added. A Limiting Oxygen Index Test (LOI) was run on a specimen prepared using this compounded latex according to ASTM D2863. The test speciman gave an LOI value of 30.3%, indicating flame retardancy.

EXAMPLE 6

In this experiment essentially the same experimental procedure that was described in Example 1 was followed. The buffer solution stream was fed into the first reactor at a rate of 4.75 lbs./hr. and had the same composition as was specified in Example 1. The monomer stream was fed into the first reactor at a rate of 4.23 lbs./hr. and consisted of 26.9 phm of butadiene, 21.6 phm of styrene, 34.2 phm of vinylidene chloride, and 0.2 phm of tert-dodecyl mercaptan. After filling the first reactor maintained at 85° C., the latex stream was directed into a second reactor maintained at 93° C. Then, a second buffer solution stream at a rate of 0.47 lbs./hr. and a second monomer stream at a rate of 0.75 lbs./hr. were continuously fed into the latex in the second reactor. The buffer solution stream consisted of 6.61 phm of water, 1.0 phm of surfactant system, and 0.25 phm of ammonium persulfate. The monomer stream consisted of 7.4 phm of styrene, 7.4 phm of butadiene, and 0.033 phm of tert-dodecyl mercaptan. The monomer split ratio by weight between Reactors 1 and 2 was about 85 to 15. After the second reactor was filled, the latex stream was directed to a third reactor maintained at 93° C. The initiator solution stream which was added to the third reactor at a rate of 0.23 lbs./hr. consisted of 4.40 phm of water and 0.15 phm of ammonium persulfate. The total residence time in the three reactors was maintained at approximately 13 hours. The overall percent conversion in the third reactor was over 90%.

The final latex from the third reactor was neutralized to a pH of 9-10 with ammonium hydroxide during stripping. The latex properties were as follows:

| Latex Properties After Stripping | |
|---|---|
| Solids, % | 52.8 |
| Brookfield viscosity, LVT #1-60 rpm mPa · s | 63 |
| Turbidity | 2.21 |
| Surface tension, mN/m | 38.3 |

A sample of the latex was allowed to dry at ambient temperature as a film. After vacuum oven drying, the film was analyzed as having a chlorine content of 20.4 weight percent and had a glass transition temperature of −6° C. The stress-strain properties of a gum film sample prepared and dried as described in Example 1 had a tensile strength of 2260 psi at 430% elongation with a 100% modulus of 365 psi.

To a sample of the final latex, 310 phr (weight parts per hundred weight parts of dry rubber) of Whiting D70 filler (a calcium carbonate type filler) and 90 phr aluminum trihydrate were added. A Limiting Oxygen Index Test (LOI) was run on a specimen prepared using this compounded latex according to ASTM D2863. The test specimen gave an LOI value of 30.9%, which indicated good flame retardancy. This example illustrates a monomer split ratio between Reactor 1 and Reactor 2 of 85/15.

EXAMPLE 7 (COMPARATIVE)

This example illustrates a typical procedure for the use of a two-stage batch emulsion polymerization process compared to the continuous polymerization process of this invention.

To a five-gallon batch reactor the following ingredients were added under a nitrogen atmosphere: 86.0 phm of water, 0.225 phm of a diphenyl oxide sulfonate surfactant, 0.10 phm of the sodium salt of ethylenediamine tetraacetate, 0.25 phm of ammonium persulfate, 1.5 phm of itaconic acid, 16.4 phm of styrene, 35.4 phm of vinylidene chloride, 21.4 phm of 1,3-butadiene and 0.21 phm of tert-dodecyl mercaptan. The polymerization was carried out at 140° F. (60° C.) until the conversion reached 29%. At this point a buffer solution consisting of 13.3 phm of water, 2.3 phm of a surfactant system (mixture of 0.53 parts of diphenyl oxide sulfonate, 1.6 parts of a sodium α-olefin sulfonate, and 0.16 parts of the sodium salt of condensed naphthalene sulfonic acid), 0.25 phm of ammonium persulfate, 0.0012 phm of tetrasodium pyrophosphate, and 0.02 phm of the sodium salt of ethylene diamine tetraacetate was added. After 1 hour, a second monomer charge consisting of 9.65 phm of styrene, 15.65 phm of 1,3-butadiene, and 0.066 phm of tert-dodecyl mercaptan was added, and the polymerization was continued until the conversion became essentially constant. The total polymerization time was 12 hours. The resulting latex conversion was 90%. The latex also contained about 25% coagulum which formed during the polymerization. Analysis of a cast and dried film of the latex showed it had 21.9% chlorine content and a glass transition temperature of −14° C. Comparison of the resulting film from this latex with that obtained by continuous polymerization in Example 1 using the same split monomer charge illustrates the different film properties obtained by utilizing batch and continuous processes using similar recipe ingredients. Also, the latex produced by continuous polymerization is coagulum free and obtained in higher conversion than the batch latex. This example shows that there are substantial differences between a batch process and the continuous polymerization process of this invention.

EXAMPLE 8

In this experiment the general procedure specified in Example 1 was followed with all of the vinylidene chloride being added in the first reactor. All feed streams were identical to those used in Example 1 except for the second buffer solution stream added to the second reactor. This buffer solution was added at the same rate of 0.36 lbs/hr but consisted of 6.31 phm of water, 0.5 phm of a surfactant system, 0.0076 phm of the sodium salt of ethylenediamine tetraacetate, 0.012 phm of tetrasodium pyrophosphate, and 0.5 phm of ammonium persulfate.

After 28 hours, the resulting latex coming out of the third reactor had the following residual monomer analysis (based on 100 grams of latex): residual styrene 0.6% and residual vinylidene chloride 0.6%.

The final latex was neutralized to a pH of 9-10 with ammonium hydroxide during stripping. The percent conversion was 96% for the latex exiting the third reactor. Latex properties were as follows:

| Latex Properties After Stripping | |
|---|---|
| Solids, % | 53.3 |
| Brookfield Viscosity, mPa · s | 63 |
| Turbidity | 2.38 |
| Surface Tension, mN/m | 43.6 |

A sample of the latex was dried at ambient temperature as a film and then vacuum dried. The film was determined to have a 22.8% chlorine content and had a glass transition temperature of 1° C.

EXAMPLE 9 (COMPARATIVE)

In this experiment the vinylidene chloride was split between the monomer streams entering the first and second reactors with the general procedure specified in Example 1 being followed. The continuous polymerization was begun by adding a buffer solution stream at the rate of 4.75 lbs/hr and a monomer stream at a rate of 3.65 lbs/hr continuously to the first reactor. The buffer solution stream was identical to that used in Example 1. The monomer stream fed into the first reactor consisted of 25.2 phm 1,3-butadiene, 21.5 phm of styrene, 26.2 phm of vinylidene chloride, and 0.13 phm of tert-dodecyl mercaptan. The second buffer stream added to the second reactor was identical to that used in Example 8. The monomer stream added to the second reactor consisted of 7.2 phm of styrene, 8.5 phm of 1,3-butadiene, 8.8 phm of vinylidene chloride, and 0.094 phm of tert-dodecyl mercaptan. The buffer solution stream added to the third reactor was identical to that used in Example 1.

After 28 hours, the resulting latex out of the third reactor had the following residual monomer analysis (based on 100 grams of latex): residual styrene 0.7% and residual vinylidene chloride 1.2%. The final latex was neutralized to a pH of 9-10 with ammonium hydroxide during stripping. The conversion was 93% for the final latex exiting from the third reactor. The final latex properties were as follows:

| Latex Properties After Stripping | |
|---|---|
| Solids, % | 53.5 |
| Brookfield Viscosity, mPa · s | 97 |
| Turbidity | 2.63 |
| Surface Tension, mN/m | 45.5 |

A sample of the latex was dried at ambient temperature as a film and then vacuum dried. The film analyzed showed a 21.5% chlorine content and had a glass transition temperature of 3° C.

Latices from Example 8 with all the vinylidene chloride added in the first reactor and Example 9 with the vinylidene chloride split in the monomer streams between the first and second reactors were dried and analyzed for gum film stress-strain properties according to the procedure described in Example 1. After drying the film from Example 9 was very brittle and possessed many cracks. Attempts to cast and dry additional films resulted in the same type of brittle, cracked and incoherent film. In contrast, the cast film from Example 8 was transparent and flexible. The table below shows some physical properties of films cast from the latices made in Example 8 and 9.

| | Tensile Strength, psi | 100% Modulus, psi | Elongation % |
|---|---|---|---|
| Example 8 | 2400 | 1710 | 180 |
| Example 9 | Brittle, cracked - not testable, unusable | | |

This example clearly illustrates the advantages of preparing latex according to the process of this invention (as done in Example 8) with all of the vinylidene chloride added continuously in the first reactor as compared to this example wherein the vinylidene chloride is split between the monomer streams added continuously to the first and second reactors. Some of the advantages illustrated are lower residual vinylidene chloride monomer content, higher chlorine content, and higher conversion, in the latices produced. The latices produced in accordance with the process of this invention can also be cast into films which exhibit improved physical properties.

EXAMPLE 10 (COMPARATIVE)

This example is included to show the necessity of adding surfactant to the second reactor and was done using the general procedure utilized in Example 1. Continuous polymerization was begun by addition of a buffer solution stream at the rate of 4.75 lbs/hr and a monomer stream at a rate of 3.62 lbs/hr continuously to the first reactor. The buffer solution stream and monomer stream were the same composition as that described in Example 1. The temperatures maintained in each reactor were also the same as those used in Example 1. The second buffer solution stream at a rate of 0.36 lbs/hr and consisting of water and 0.5 phm of ammonium persulfate (no surfactant) was fed continously to the second reactor. A second monomer stream at a rate of 1.25 lbs/hr was also continously fed into the second reactor. The monomer stream consisted of 12.5 phm of styrene, 12.5 phm 1,3-butadiene, and 0.094 phm of tert-dodecyl mercaptan. The monomer split ratio by weight between the first and second reactors was 75 to 25. To the third reactor, a buffer stream at a rate of 0.2 lbs/hr consisting of water and 0.29 phm of ammonium persulfate was added. After 24 hours of continuous polymerization the conversion of the resulting latex out of the third reactor was 84%. This example shows that lower conversion latex is obtained when no surfactant is added to the second reactor.

While certain representative embodiments and details have been shown for the purpose of illustrating the invention, it will be apparent to those skilled in this art that various changes and modifications may be made therein without departing from the scope of the invention.

What is claimed is:

1. An improved continuous aqueous emulsion polymerization process for the preparation of flame retardant latex comprising the steps of:
   (a) continuously adding to a first reaction vessel a mixture of reagents consisting essentially of: at least one emulsifying agent, at least one monoethylenically unsaturated carboxylic acid, ester or amide, at least one aliphatic conjugated diolefin, water, a buffer, at least one monovinylidene aromatic monomer, vinylidene chloride and at least one polymerization initiator;
   (b) allowing said mixture of reagents to remain in said first reaction vessel for 3 to 6 hours for partial polymerization to take place to a conversion of 70% to 85% to form a partially polymerized latex, wherein the partially polymerized latex is withdrawn from the first reaction vessel continuously at a rate equal to the total rate of addition of the mixture of reagents to the first reaction vessel and wherein the partially polymerized latex is fed into a second reaction vessel;
   (c) continuously adding to the second reaction vessel additional reagents consisting essentially of conjugated diolefins, monovinylidene aromatic monomers, polymerization initiator, buffer, and emulsifying agents to form a partially polymerized latex/monomer mixture wherein the total monomers charged into the first and second reactors are comprised of from about 15 to about 45 weight percent of vinylidene chloride, from about 0.2 to about 5 weight percent of monoethylenically unsaturated carboxylic acids, esters or amides, from about 20 to about 75 weight percent of aliphatic conjugated diolefins, and from about 55 to about 5 weight percent of monovinylidene aromatic monomers, wherein from 50% to 95% by weight of the total monomers charged into the first and second reaction vessels are charged into the first reactor, wherein said partially polymerized latex/monomer mixture is allowed to remain in the second reactor for 3 to 6 hours for a substantial degree of polymerization to take place to form a substantially polymerized latex having a conversion of 85% to 95% and wherein the substantially polymerized latex made in the second reactor is withdrawn continuously at a rate equal to the total rate of addition of the partially polymerized latex and additional reagents to the second reaction vessel and fed into a third reaction vessel;

(d) allowing the substantially polymerized latex to remain in the third reaction vessel for 3 to 6 hours until essentially complete conversion of at least 90% takes place.

2. A process as specified in claim 1 wherein the monoethylenically unsaturated carboxylic acid is itaconic acid, wherein the aliphatic conjugated diolefin is butadiene, and wherein the monovinylidene aromatic monomer is styrene.

3. A process as specified in claim 2 wherein the total monomers charged into the first and second reaction vessels are comprised of from 25 to 40 weight percent vinylidene chloride, from 1 to 3 weight percent itaconic acid, from 25 to 50 weight percent butadiene, and from 15 to 35 styrene.

4. A process as specified in claim 3 wherein from 60% to 90% by weight of the total monomers charged into the first and second reactors are charged into the first reaction vessel.

5. A process as specified in claim 4 wherein said polymerization initiator is a persulfate initiator.

6. A process as specified in claim 5 wherein the polymerization temperature is from about 60° C. to about 100° C.

7. A process as specified in claim 6 wherein from 10% to 80% by weight of the total butadiene charged is charged into the second reaction vessel and wherein from 5% to 80% by weight of the total styrene charged is charged into the second reaction vessel.

8. A process as specified in claim 7 wherein from 0.3 phm to 8 phm of emulsifying agents are present in the mixture of reagents.

9. A process as specified in claim 8 wherein the polymerization temperature is from 70° C. to 95° C.

10. A process as specified in claim 9 wherein from 30% to 60% by weight of the total butadiene charged is charged into the second reaction vessel and wherein from 25% to 55% by weight of the total styrene charged is charged into the second reaction vessel.

11. A process as specified in claim 10 wherein from 0.3 phm to 2 phm of emulsifying agents are charged into the first reaction vessel and wherein from 0.15 phm to 1.5 phm of emulsifying agents are charged into the second reaction vessel.

12. A process as specified in claim 11 wherein additional initiator is added to the third reaction vessel.

13. A process as specified in claim 12 wherein from 0.4 phm to 1 phm of emulsifying agents are charged into the first reaction vessel and wherein from 0.2 phm to 1 phm of emulsifying agents are charged into the second reaction vessel.

* * * * *